Feb. 23, 1965   W. F. PLUME   3,170,339
VALVE OPERATOR
Filed March 23, 1961   6 Sheets-Sheet 1

INVENTOR
William F. Plume

BY
ATTORNEYS

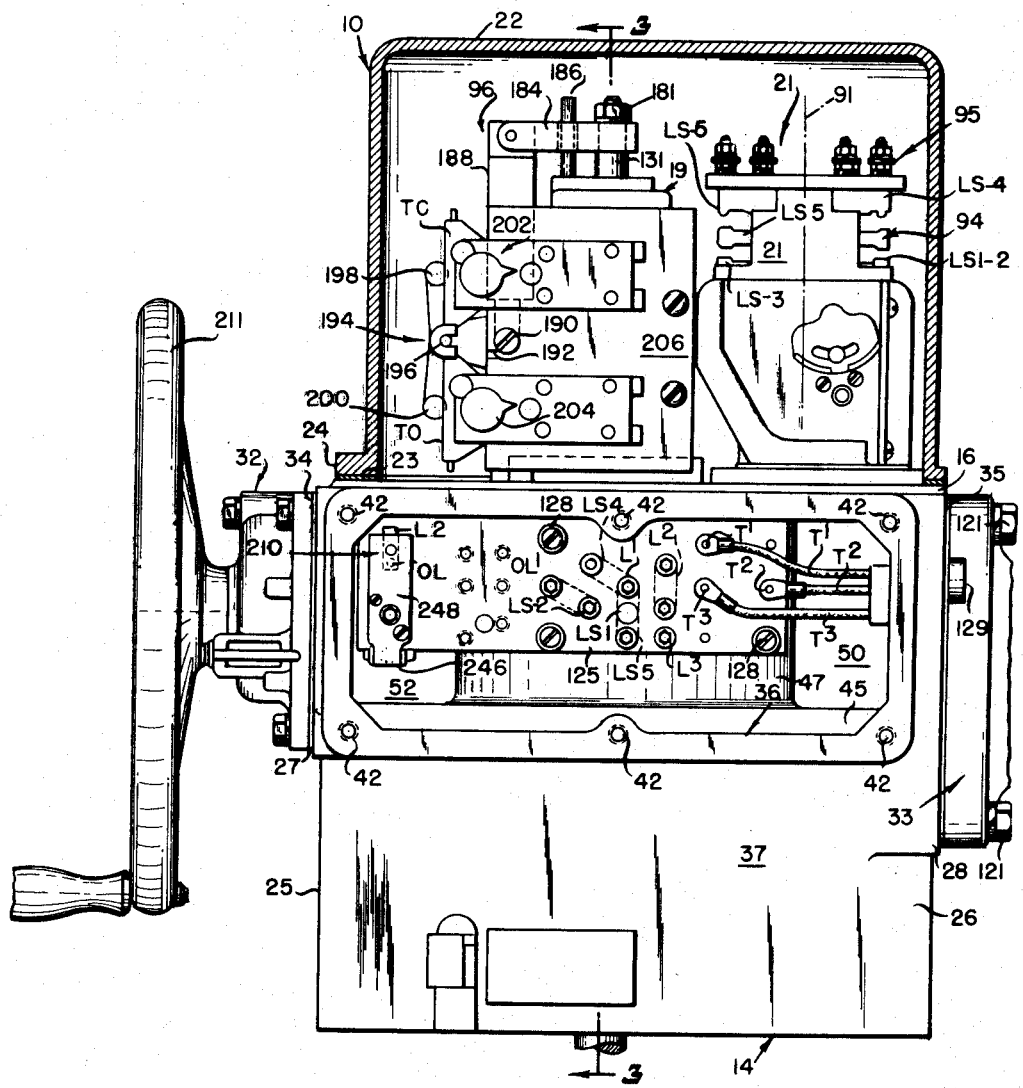

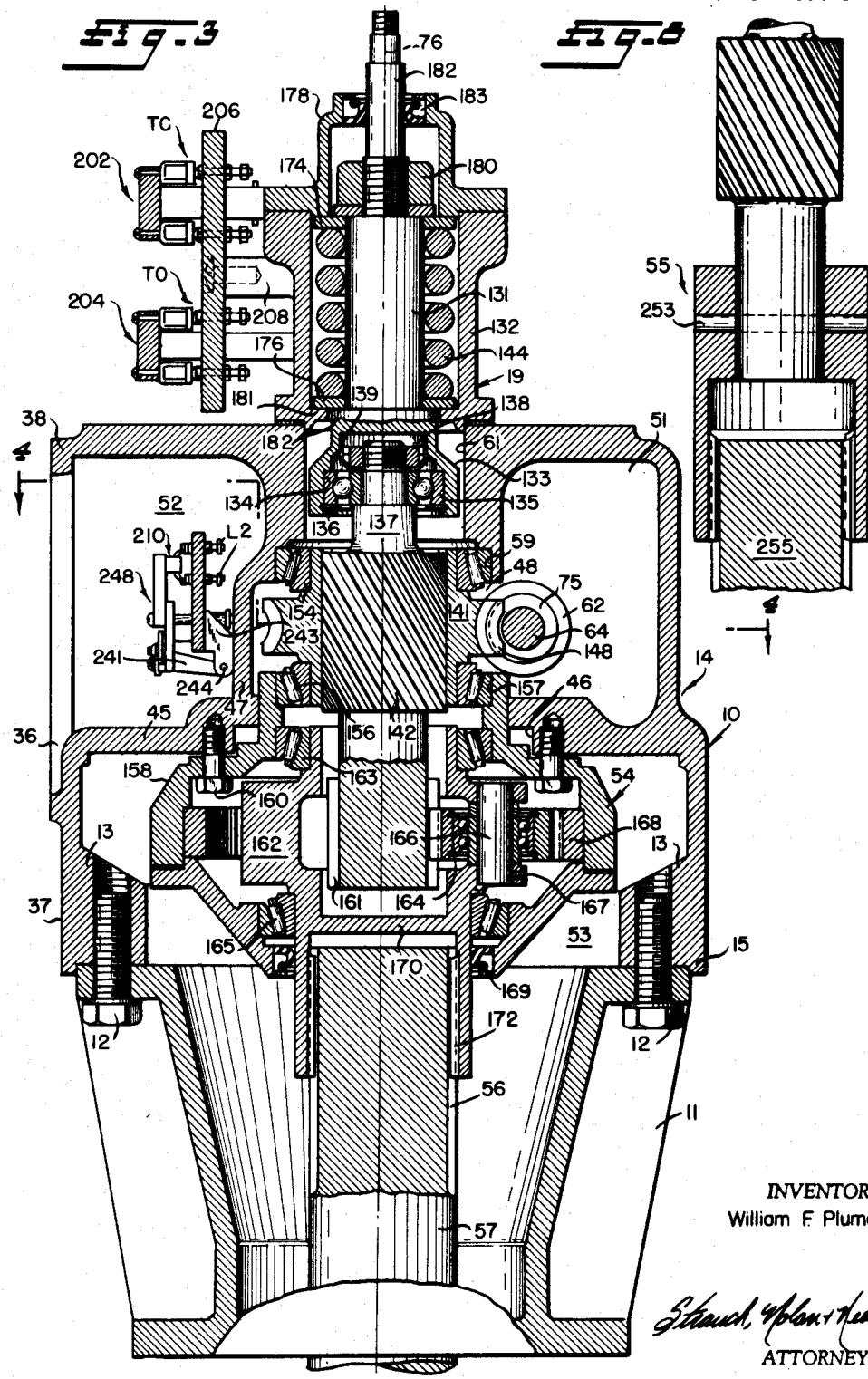

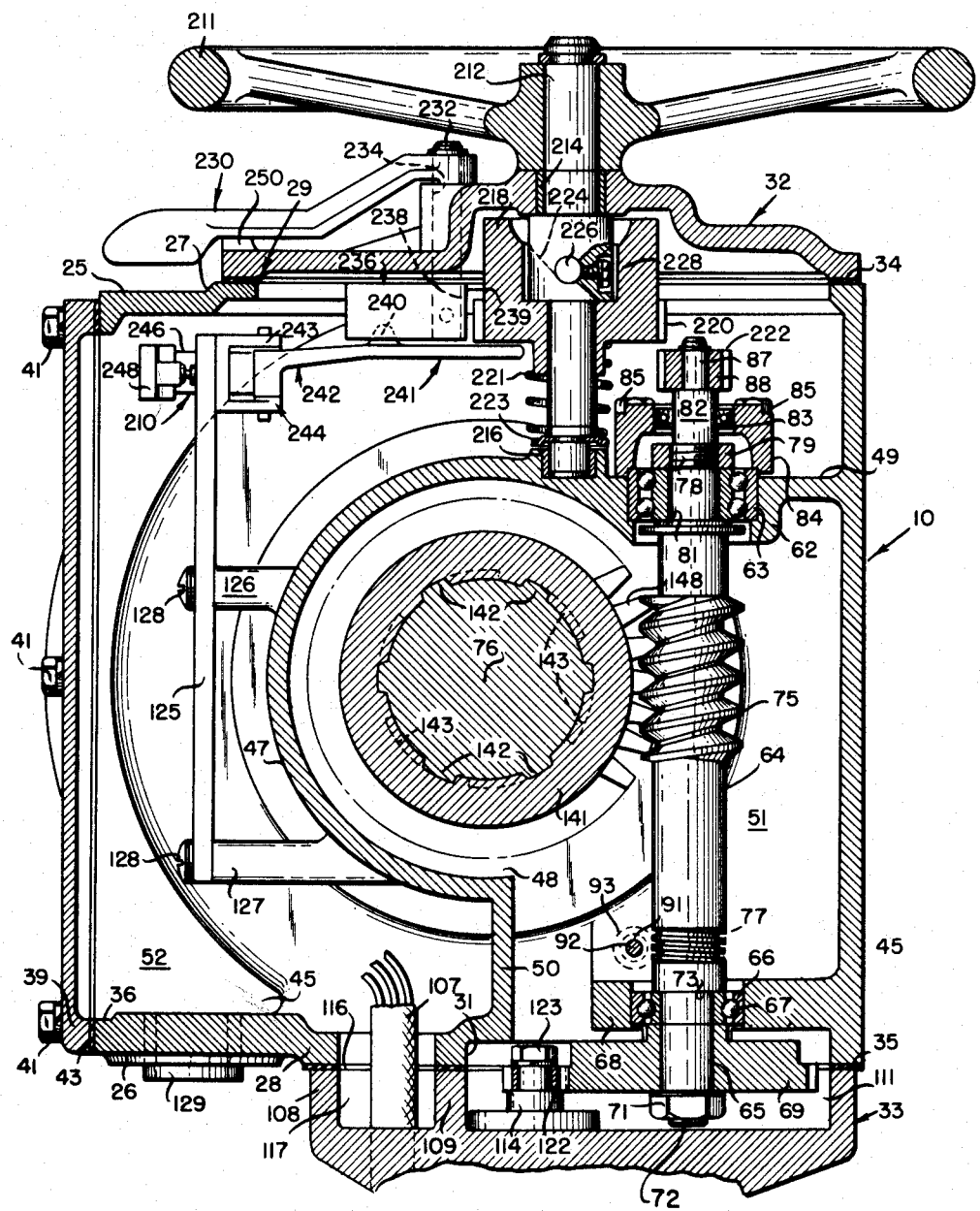

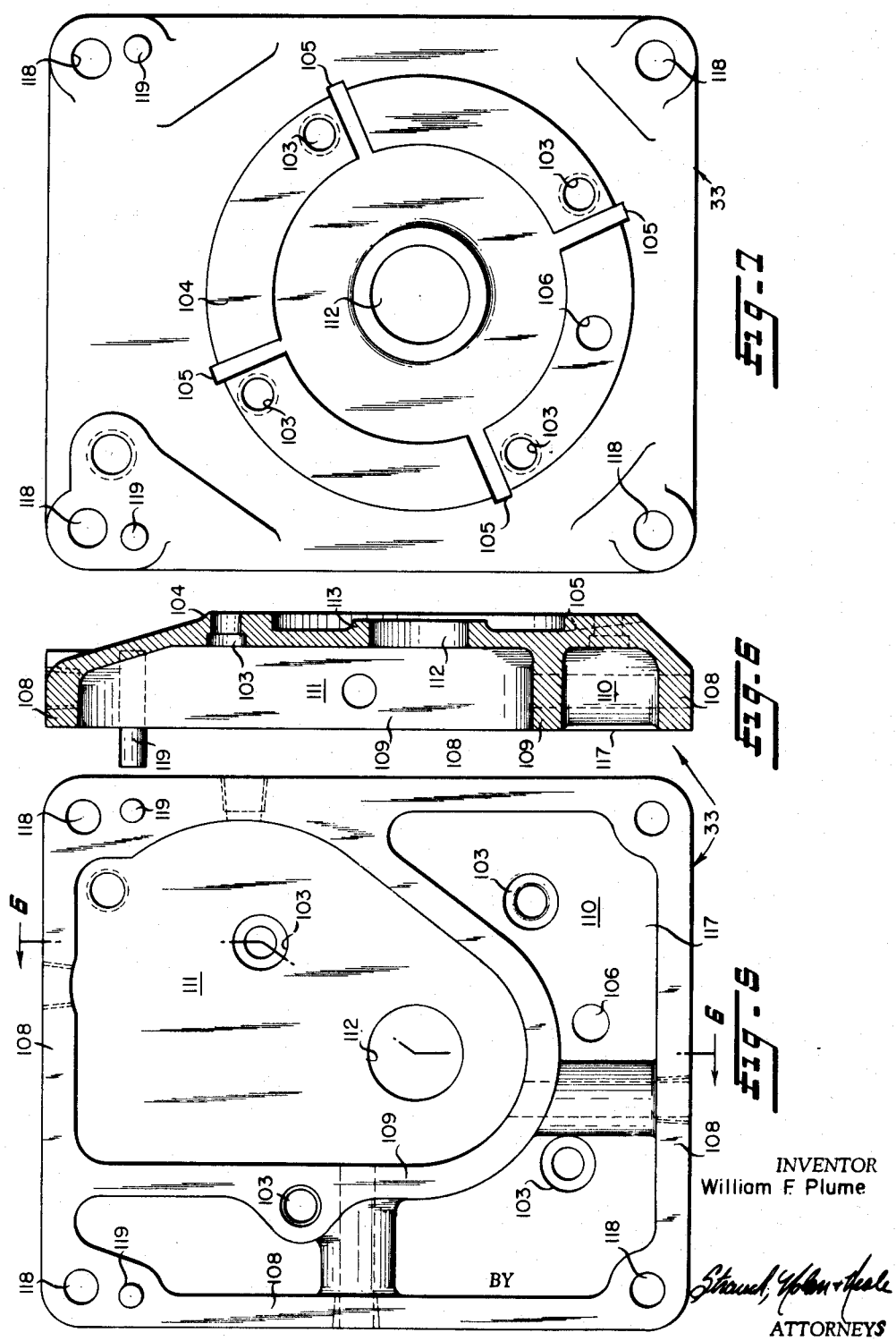

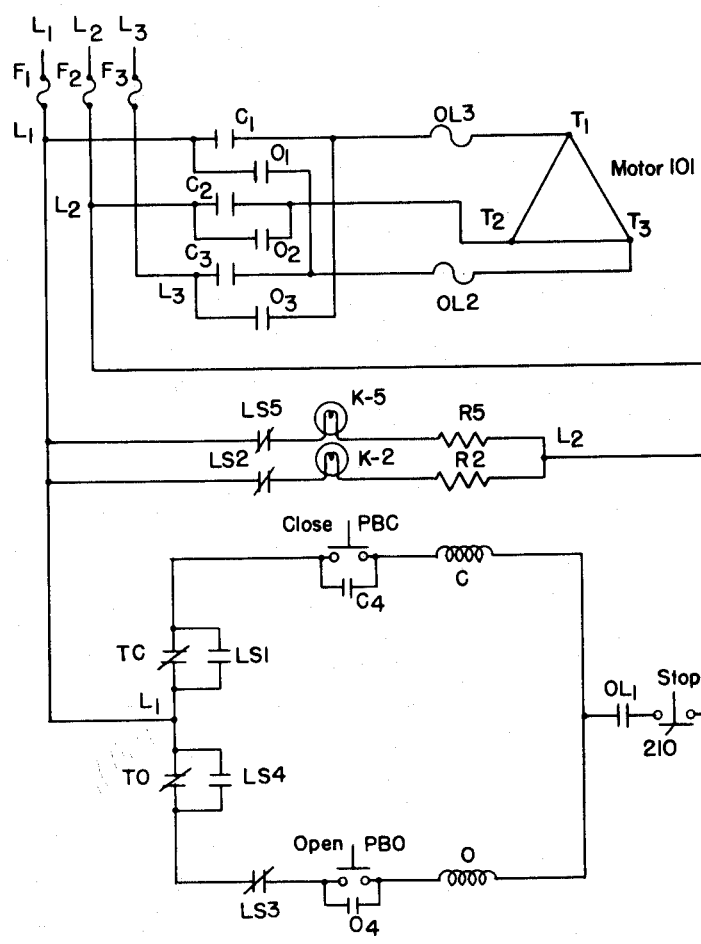

United States Patent Office 3,170,339
Patented Feb. 23, 1965

3,170,339
VALVE OPERATOR
William F. Plume, Wheaton, Ill., assignor, by mesne assignments, to Link-Belt Company, a corporation of Illinois
Filed Mar. 23, 1961, Ser. No. 97,821
18 Claims. (Cl. 74—626)

The present invention relates to valve operators and more particularly to improvements in electric motor driven valve operators and the drive gearing and controls therefor.

Motor driven valve operators are known in the art and examples thereof are disclosed in United States Letters Patent 1,948,709, issued February 27, 1934, to J. Hackethal, 2,005,891, issued June 25, 1935, to R. S. Elberty, Jr., and 2,302,848, issued November 24, 1942, to E. J. Fitz. Operators of the type shown in these prior patents require special motor housings adapting the motors for mounting on the operator housings and are limited in utility because of the nature of the drive gearing and controls provided therefor.

It, accordingly, is the primary object of the present invention to provide a valve operator having gearing and controls constructed in such a manner as to more expeditiously adapt them to automatically disrupt the motor power circuit upon encountering an obstruction to normal opening and closing movement of the valve or reaching their open or closed positions and a motor adaptor plate permitting utilization of a standard commercially available motor.

A further object of the present invention resides in the provision of a valve operator having a novel motorized gear drive incorporating a torque switch actuator shaft or stem spline connected to the motor driven worm gear by helical splines adapted to provide two way torque protection through journalled connection to a simple coil spring actuated switch actuating plunger.

Still another object of the present invention resides in providing a valve operator in accord with the immediately preceding object wherein the actuator shaft or stem is readily replaceable to adapt the operator for driving connection to the valve stem either through a planetary gear assembly or an adaptor coupling to effect a direct drive connection while assuring two way torque protection.

A further object of the present invention is to provide a valve operator having two way torque protection through a simple relatively friction free torque limiting device comprising a driven bronze worm gear having internal helical splined connection to a matingly splined steel actuating shaft or stem and a directly connected spring reaction type switch actuating plunger.

Still another object of the present invention resides in forming the spline connection of the immediately preceding object with a low helix angle to assure a high lead angle thereby providing a comparatively small thrust reaction for a high torque value, permitting use of a small low cost torque spring assembly, and freedom in the selection of the spline helix angle since the helix angle is completely independent of torque, unit size, center destance of gear sets and gear set ratios.

A further object of the present invention resides in providing a motor driven valve operator attachment unit having a high speed motor driven input worm gear set with a planetary gear output assembly whereby the motor driven valve operator attachment unit provides a desirable high overall gear ratio without employment of efficiency reducing high worm gear ratios while eliminating the bulky, offset center, space consuming gear housings required where spur gear sets are employed to obtain desired overall gear ratios.

Another object of the present invention resides in providing a valve operator having two way torque protection wherein the torque spring assembly, torque limit switches, torque limit switch terminal boards and the operating linkage therefor may be disposed on top of the unit for ready access for adjustment and servicing merely upon removal of the protective cover housing.

Further objects will appear from the following description and appended claims when read in conjunction with the accompanying drawings wherein:

FIGURE 2 is a front elevational view of the valve operator of FIGURE 1 with the cover housing in section, the cover plate for the main panel board removed to show the terminal connections for the electrical control circuitry and the motor and part of the motor adaptor plate omitted;

FIGURE 3 is a sectional view taken substantially on line 3—3 of FIGURE 2 looking in the direction of the arrows, the cover housing and portions of the torque switches and switch linkage being omitted;

FIGURE 4 is a sectional view taken substantially on line 4—4 of FIGURE 3;

FIGURE 5 is a left side plan view of the motor adaptor plate provided by this invention;

FIGURE 6 is a sectional view taken substantially on line 6—6 of FIGURE 5;

FIGURE 7 is a right side plan view of the motor adaptor plate of FIGURE 5;

Figure 1:
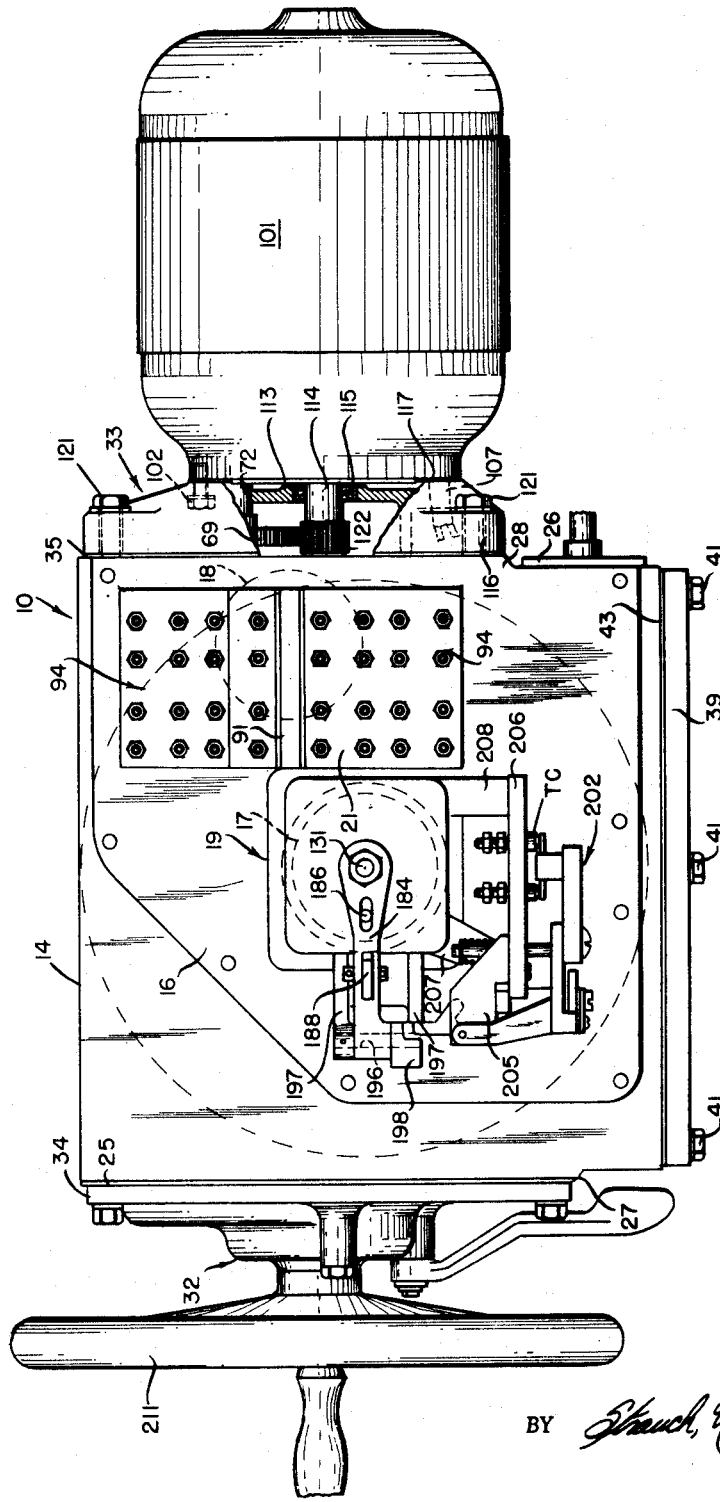
FIGURE 1 is a top plan view of the motorized valve operator attachment of the present invention with the cover housing removed.

FIGURE 8 is a fragmental sectional view illustrating a modified torque switch actuator shaft or stem and adaptor coupler employed in place of the torque switch actuator shaft or stem of FIGURES 3 and 4 when a direct drive connection to the valve stem is desired; and FIGURE 9 is a wiring diagram illustrating the electrical control circuitry employed in the operator mechanism of the present invention.

With continued reference to the drawings wherein the various parts are respectively designated throughout by the same reference numeral, numeral 10 designates generally the motor driven valve operator attachment provided by this invention. As best seen in FIGURE 3, attachment 10 is supportingly mounted on the valve yoke 11 by means of machine bolts 12 threaded into tapped mounting ears 13 formed in annularly spaced relation around the inner wall face of a main body housing 14. Preferably the lower mating face of housing 14 cooperating with yolk 11 is annularly lipped as indicated at 15 to receive the mounting flange of yoke 11.

The upper face of housing 14 is formed with a mounting pad 16 suitably apertured at 17 and 18 to mount the torque switch assembly 19 and the usual limit switch assembly 21 in side-by-side relation to be housed by a common cover housing 22 (FIGURE 2). As best seen in FIGURE 2, a suitable sealing gasket 23 is interposed between pad 16 and the clamp flange 24 of cover housing 22. Housing 14 at its opposite side wall faces 25 and 26 is provided with respective mounting pads 27 and 28 defining through apertures 29 and 31 (FIGURE 4) for mounting a handwheel and manual lockout switch support cover assembly 32 and a motor adaptor plate 33. Preferably sealing gaskets 34 and 35 are interposed between pad 27 and cover assembly 32 and pad 28 and adaptor plate 33 to seal the communicating housing chambers respectively against ingress of foreign matter and egress of lubricant.

The other pair of sidewall faces are closed faces except for the elongated access opening 36 formed in the upper portion of wall 37 and defined by mounting pad 38. Access opening 36 is normally closed by a cover plate 39 secured in place by cap screws 41 threaded into tapped openings 42 in mounting pad 38. A sealing gasket 43 interposed between pad 38 and cover plate 39 seals access opening 36 against ingress of foreign matter.

Housing 14 is provided approximately midway of its height with a partition wall 45 having a centered, through, stepped opening 46 therein and dividing housing 14 into upper and lower chamber areas. Partition wall 45 carries an integrally formed generally cylindrical upstanding wall 47 having an arcuate side opening 48 (FIGURES 3 and 4) beginning at the level of the upper face of wall 45 and extending upwardly about one half the distance to the upper wall face. Adjacent sidewall 25 wall 47 is joined by a generally tangentially disposed end wall 49 (FIGURE 4) which together with wall 47 and a right angular related partition wall 50 divides the upper chamber area into a gear chamber 51 (FIGURES 3 and 4) and an electrical panel board and switch chamber 52 (FIGURES 2, 3 and 4). The lower chamber area 53 (FIGURE 3) is completely unobstructed and is adapted to receive the gear box assembly 54 or shaft coupling element 55 (FIGURE 8) selectively provided to drivingly connect valve operator 10 to the upper protruding splined end 56 of the valve stem 57 or to the worm shaft of a reciprocating gate valve. Wall 47, as best seen in FIGURE 3, is reduced in diameter between the upper level of arcuate opening 48 and the upper housing face and formed with a stepped bore to form a bearing seat 59 opening downwardly toward through stepped opening 46 in wall 45 and an upwardly extending reduced diameter bore 61 opening upwardly through upper face pad 16 for a purpose to be presently pointed out.

End wall 49 on its face defining chamber 51 is provided with a cylindrical apertured boss 62 (FIGURES 3 and 4) the axis of which lies in a plane midway between the upper and lower limits of arcuate opening 48. Boss 62 is counterbored through opening 29 to form a bearing seat adapted to mount a double row ball bearing 63 provided to journal one end of a high speed input worm shaft 64. Shaft 64 spans chamber 51 between wall 49 and opening 31 in housing wall 26 and its end 65 lying in opening 31 is journalled inwardly thereof by a single row ball bearing 66 slidably supported in a through bore 67 formed in a segmental wall 68 rising upwardly from partition wall 45 inwardly from housing side wall 26 with its end remote from wall 50 merging into the opposing closed wall of housing 14. Worm shaft end 65 mounts an enlarged input gear 69 the hub of which bears against the inner race of bearing 66 and is is abutted by a clamp nut and washer assembly 71 carried by a threaded section of a reduced diameter shaft tip 72 and adapted when screwed home to secure gear 69 and the inner race of bearing 66 to shaft 64 by clamping the inner bearing race and gear hub between clamp nut assembly 71 and shaft shoulder 73.

Worm shaft 64 has primary worm pinion teeth 75 formed on it throughout a portion of its length extending a predetermined distance either side of a plane normal to its axis and containing the common axis 76 of housing bore 61, stepped opening 60, housing lip 15, yoke 11 and valve stem 57. Worm shaft 64 adjacent but inwardly from shoulder 73 has worm threads 77 cut into its periphery. Worm shaft 64 extends beyond bearing 63 into chamber 52 and is threaded at 78 to receive a clamp nut 79 adapted to clamp the inner race of bearing 63 against shaft shoulder 81. The portion 82 of shaft 64 slidably cooperates with the oil seal 83 of an oil seal housing 84 which straddles clamp nut 79 and has bearing engagement on the outer race of bearing 63. Cap screws 85 threaded into suitably tapped opening (not shown) in wall 49 draw housing 84 toward wall 49 when threaded home causing housing 84 to clampingly secure the outer race of bearing 63 in its seat in wall 49 and fix worm shaft 64 against axial movement. In this connection, the sliding association of bearing 66 in its seat 67 permits bodily movement of worm shaft 64 assuring its fixed positioning in boss 62. The extreme end 87 of shaft 64 non-rotatably mounts a pinion gear 88 adapted, in a manner to be hereinafter described, to effect manual operation of valve stem 57. From an inspection of FIGURE 4, it will be appreciated that worm shaft 64 and bearings 63 and 66 and oil seal housing 84 may be bodily removed through opening 29 of housing 14 upon removal of cover assembly 32, adaptor plate 33 and gear 69 merely by removing cap screws 85 and grasping housing 84 and moving it axially through opening 29 drawing shaft 64 through the stepped bore of boss 62 which is dimensioned to freely pass teeth 75 and bearing 66.

*Limit switch drive*

Referring for the moment to FIGURES 1, 2 and 4, it will be appreciated that limit switch assembly 21 is located on mounting pad 16 adjacent adaptor plate 33 and remote from cover assembly 32 with its vertical axis 91 lying in a plane normal to worm shaft 64 and bisecting the worm thread section 77. Limit switch assembly 21 supports a worm gear shaft 92 (FIGURE 4) the lower depending end of which is provided with gear teeth 93 meshing with the worm thread 77. The axis of worm gear shaft 92 is coincident with axis 91 of limit switch assembly 21 and at its upper end shaft 92 is conventionally drivingly connected to actuator arm 94 (FIGURE 2) of any well-known type of limit switch contactor assembly 95 employed to disrupt the motor circuit upon the valve reaching its fully open or fully closed position. Arm 94 as seen in FIGURE 2 is in its midposition between the upper switch contacts LS–4 and LS–5 and lower switch contacts LS–1 and 2 and LS–3. This switch moves rapidly from one set of contacts to the other set at one limit of travel as determined by the previous adjustment of the limit gears. There are two independent switch assemblies as described, one for each limit of operation. It will be appreciated from the description just given that limit switch actuator arm 94 is driven by worm gear shaft 92 which in turn is driven by worm threads 77 of the high speed input worm shaft 64. Since this drive train is well-known in the art and a conventional drive train forming no part of the present invention, a more detailed description is not believed necessary here.

*Valve stem drive train*

Referring first to FIGURES 1 and 4, drive motor 101 is bolted to adaptor plate 33 by cap screws 102 passing freely through bolt apertures 103 (FIGURES 5, 6 and 7) of adaptor plate 33 and threaded into the tapped apertures (not shown) normally provided in the motor housing of a standard NEMA "C" flange three phase motor. Use of such a standard motor in the valve operator field is made possible by adaptor plate 33 one face of which is formed with an annular centrally recessed mounting pad 104 of generally circular configuration (FIGURE 7) slotted at four diametrically opposite points 105 to provide oil drains for leakage oil and dimensioned to matingly cooperate with the circular motor housing end face of such standard motors. As best shown in FIGURE 7, mounting bolt apertures 103 are four in number and lie on a center contained within face pad 104. A fifth aperture 106 lying within the confines of the annular face of pad 104 is located to align with and freely pass the motor lead cable 107 (FIGURE 1) through the peripherally located adaptor plate chamber 110 formed between the peripheral edge flange 108 and the inset segmental flange 109 defining a gear box chamber 111 at the rear face of adaptor plate 33.

Centered in the recess formed by annular pad 104 is an enlarged through opening 112 coaxially related to an annular boss 113 protruding into the recessed area lying within pad 104. The motor shaft 114 passes through opening 112 which is preferably fitted with an oil seal 115 (FIGURE 1) to prevent passage of oil along shaft 114 from gear box chamber 111 to the air space inside of pad 104 and to the standard motor seal. As will be apparent from FIGURES 1 and 4, pad 28 of housing 14 is shaped to provide openings and clamp faces disposed to matingly cooperate with adaptor plate chambers 110 and 111 and the end faces of flanges 108 and 109 and gaskets 116 and 117 are interposed between housing 14 and adaptor plate 33 and adaptor plate 33 and the mating motor housing end face respectively. These gaskets prevent communication between the adaptor plate gear box chamber 111 and the adaptor chamber 110 and lead wire passage into the motor housing. Gasket 116 also prevents communication between chambers 51 and 52 of housing 14 since the clamp face mating with adaptor plate flange 109 is formed integrally with and forms an extension of housing wall 50.

Adaptor plate 33 is preferably first secured to the housing face of motor 101 by cap screws 102 and the adaptor plate with the motor mounted thereon is secured to housing wall 26. To assure proper positioning of the assembled motor and adaptor plate, the adaptor plate below and closely adjacent the upper pair of the four corner located mounting bolt apertures 118 is provided with respective positoning pins 119. Pins 119 are slidably associated with locating holes (not shown), drilled in predetermined relation in housing wall 26 and serve to support the motor weight after pins 119 are once inserted to ease the problem of entering and threading home the mounting screws 121.

Motor shaft 114 is drivingly connected to gear 69 by a pinion gear 122 secured to shaft 114 by a key spline (not shown) and a clamp nut 123. The three leads of motor lead cable 107 lead from adaptor chamber 110 to housing chamber 52 where they are connected to contacts $T^1$, $T^2$, $T^3$ of panel board 125 mounted conventionally in housing chamber 14 on mounting bosses 126 and 127 integrally formed on partition wall 47. Mounting screws 128 accessible through access opening 36 removably secure panel board 125 in assembled relation. Current enters panel board 125 through leads $L^1$, $L^2$ and $L^3$ from a cable member (not shown) which enters chamber 52 directly from the outside of housing 14 through inlet duct element 129 fixed in a suitable aperture in wall 26. The control circuitry connecting contacts $L^1$, $L^2$ and $L^3$ with motor lead contacts $T^1$, $T^2$ and $T^3$ is shown diagrammatically in FIGURE 9 and will be described presently in detail. Suffice it to say for the present that motor 101 is reversible and through the control circuitry is adapted to rotate shaft 114 and gears 69 and 122 driven thereby in opposite directions to provide driving power for selectively moving valve stem 57 in valve opening or closing direction as may be required.

Since powered movement of valve stem 57 may result in breakage of valve parts or the mechanism of the operator if an obstruction is encountered or if closing or opening movement of a butterfly or other limited movement valve is continued after the full seated or unseated position is reached, the present invention provides both a torque limit motor cut off circuit and a limit switch motor cut off circuit. The torque limit motor cut off circuit is controlled by a switch actuator plunger 131 (FIGURES 1, 2 and 3) reciprocably mounted in tubular housing assembly 132 of torque switch assembly 19 concentrically mounted with respect to bore 61 of housing 14. Plunger 131 has its dependent, recessed cylindrical end 133 protruding from the lower end of housing assembly 132 into bore 61 of main body housing 14. Plunger end 133 has a downwardly opening stepped bore coaxially related to bearing seat 59 of housing wall 47 and providing a bearing seat 134 and snap ring groove for respectively receiving a connector bearing 135 and retainer ring 136 for non-rotatably coupling plunger 131 to the low speed worm set power take-off shaft 137, the upper end of which clampingly mounts connector bearing 135 between an annular shoulder and a clamp nut 138 threaded onto the reduced threaded end of shaft 137.

Nut 138 is preferably locked to shaft 137 by means of a multi-fingered lock washer 139 (FIGURE 3), the peripheral faces of nut 138 being notched to receive a bent up finger of washer 139.

Power take-off shaft 137 is non-rotatably and relatively axially shiftably coupled to worm ring gear 141 by means of helical splines 142 of shaft 137 (FIGURE 3) and mating internal helical spline grooves 143 (FIGURE 4) formed in the hub bore of worm ring gear 141. While any suitable helix angle may be employed, it is preferred to employ a low helix angle or high lead angle so that a comparatively small thrust reaction will result from a high torque resistance. By so designing the helical spline coupling a small torque resistance spring 144 (FIGURE 3) to yieldingly bias plunger 131 and shaft 137 to their intermediate axial positions and establish an operative torque value sufficiently high to permit the transmission of torque forces adequate to overcome the torque resistance normally encountered in closing or opening the valve in question. By way of example, a helix angle of 30° has been found suitable for motorized operation of butterfly valves having 90° stem movement and employed in a water system where slow closing movement, a high overall gear ratio and torque limit control in both directions are requirements. In this example, a steel splined power take-off shaft 137 operating in a bronze worm ring gear 141 is preferably employed to reduce sliding friction and thereby assure availability of the maximum thrust force to actuate the torque resistance spring 144 and greater accuracy in torque seating of the valve itself.

Furthermore, the inclusion of the torque responsive element and power take-off element 137, in the worm ring gear assembly, instead of in the driving worm as has been generally done in prior art devices permits the use of a simple, integral, compact input worm shaft 64 and worm gear teeth 75 which not only decreases the size of the input worm gear mechanism but additionally permits a freedom heretofore unknown in selecting a worm tooth pitch to obtain maximum efficiency and strength for a given input gear ratio. Further, this construction permits the reduction of size of the entire valve operator.

Worm ring gear 141 is mounted at its upper and lower ends in thrust bearings 154 and 156 respectively disposed within bearing seat 59 and an opposing seat 157 formed in housing 158 of gear box assembly 54 fitted into opening 46 in partition wall 45 with longitudinally centered worm gear teeth 148 projecting outwardly through arcuate opening 43 of side wall 47 into engagement with input worm thread 75. Housing 158 is bolted to the underside of partition wall 45 by a plurality of bolts 160.

The lower spur pinion end 161 of power take-off shaft 137 extends into gear box assembly 54 into a cylindrical planet gear carrier 162 rotatably mounted on spaced upper and lower thrust bearings 163 and 165 mounted in gear box assembly housing 158. End 161 of power take-off shaft 137 axially slidably drivingly coacts with the teeth of annularly arranged planet gears 164, one of which is shown, rotatably journalled on pins 166 fixedly mounted in opposed bores of planet gear carrier 162 by any suitable means, for example, set screws 167. Planet gears 164, preferably three equi-angularly spaced around shaft end 161, interact with stationary planet ring gear 168 upon their rotation by power take-off shaft 137 to cause planet gear carrier 162 to rotate at a reduced speed.

Oil seal 169 at lower end of housing 158 retains lubricant for gears and bearings. The hollow hub end is closed by an inset partition wall 170 and is provided anteriorly of wall 170 with internal straight splines 172 which slidably receive the upper matingly splined end 56 of valve stem 57.

It will be apparent to one skilled in the art that a rotation of input worm shaft 62 will cause rotation of worm gear ring 141, power take-off shaft 137, planet gear carrier 162, and ultimately valve stem 57 through the gear train above described. At the same time shaft 64 through worm drive threads 77 and 93 drives shaft 92 and one or the other limit switch actuator arms 94 in one or the other direction depending upon the direction of rotation of shaft 64.

The planetary gearing provides a high gear reduction ratio at the output end of the gear train and permits the selection of a low worm gear ratio at the input end of the gear train, thus providing maximum efficiency, less gear wear and a smaller drive train mechanism. Further, the rolling action of the sun gear teeth (the splined end 161 of power take-off shaft 137 with respect to planet gears 164) affords minimal frictional resistance to the axial shifting of power take-off shaft 137 when the helical splined connection between worm gear ring 141 and power take-off shaft 137 shifts axially in response to a sensed predetermined torsional resistance to movement of the valve stem 57.

Torque limit drive

Upon axial shifting of power take-off shaft 137, torque limit motor actuator plunger 131 moves directly with shaft 137 and its movement is resisted by the friction drag between the bronze helical grooves 143 of worm gear ring 141 and steel splines 142 of power take-off shaft 137 and the resistance of spring 144. Spring 144 surrounds plunger 131 in housing assembly 132 and acts at its upper and lower ends against washers 174 and 176 respectively. Upper washer 174 acts against an internal annular flange of a cylindrical actuator housing assembly closure cap 178 and against a nut and washer assembly 180 screwed on the reduced end of plunger 131. Lower washer 176 acts against an internal annular flange 181 of housing assembly 132 and against an annular shoulder seat 182 formed by the oversized dependent end of plunger 131. It will be noted that the helical connection of shaft 137 and worm gear 141 and the one spring 142 act in the same manner to provide over-torque protection in either direction of rotation of shaft 137 to effect valve operation. Also separate springs could be substituted for the single spring 144 by causing their outer ends to react against housing 132 and their inner ends against a central shoulder provided on plunger 131.

The end 182 of switch actuator plunger 131 extends through oil seal 183 received in the open end of cap 178 and its tip is threaded for receiving a clamp nut and washer assembly 181 for fixedly connecting plunger 131 to one end of an actuator arm 184 of torque limit switch actuator linkage 96. Arm 184 (FIGURE 2) has a through guide bore midway of its length slidingly receiving a guide pin 186. Arm 184 at its other end is pivotally connected to a depending rod 188 the lower end of which is pivotally connected by pivot pin 190 to the stem end 192 of a T-shaped bell crank 194. Bell crank 194 in turn is pivotally mounted on a fixed pivot pin 196 carried in arms 197 formed on housing 132 so that upon pivotal movement of bell crank 194 about pin 196 its ends 198 and 200 move in opposite directions to actuate torque close limit switch 202 and torque open limit switch 204 respectively. Limit switches 202 and 204 are in general similar to switch 210 to be presently described and are pivotally mounted on bracket 205 carried by panel board 206 secured to mounting posts 207 and 208 also formed on housing 132. It will be appreciated that the amount of opening or closing torque required to shift the torque limit plunger 131 may be selectively varied within limits by adjustable actuating cams on switches 202 and 204 which control the degree of compression of spring 144 or by substituting a different spring 144. It will be apparent, therefore, that upon axial upward movement of plunger 131 in response to an over-torque condition in the valve opening direction that crank 184 will move upwardly lifting rod 188 to pivot bell crank 194 counterclockwise about pivot pin 196 to actuate limit switch 204. Conversely, upon downward movement of plunger 134 bell crank 194 will be caused by this same linkage to pivot clockwise to cause bell crank end 198 to actuate limit switch 202.

To maintain the torque limit switch assembly and limit switches moisture and dust free, a cover 22 is provided over these components. It will be apparent to one skilled in the art that the structure just mentioned provides over-torque protection for the valve operator during opening or closing movement and that such structure, due to its durable guided construction, is highly dependable and long lasting.

Electrical control system

Referring now to FIGURE 9 there is shown digrammatically the electrical control system for the valve operator of the instant invention.

Three power lines L1, L2 and L3 are provided which connect in a manner to become more apparent through fuses F1, F2 and F3 to the three phase motor having terminals T1, T2 and T3 through contacts C1, C2 and C3 or O1, O2 and O3 of holding coils C (closing coil) and O (opening coil) respectively.

The circuit for holding coil C includes contacts LS1 of mechanically actuated limit switch assembly 21 contained in a shunt circuit around normally closed torque limit switch TC, normally open valve closing push button PBC and its normally open shunt holding switch circuit contacts C4 closing of which is controlled by energization of holding coil C, normally closed overload switch OL1 and normally closed manual cut out switch 210 series connected in the common ground lead of the three line system. Holding coil C, upon energization, additionally closes its holding contacts C1, C2, C3 and C4 to establish a closed circuit through these contacts through normally closed overload switches OL2 and OL3 to motor 101 from lines L1, L2 and L3 to cause energization of the motor in the valve closing direction, and to maintain contact across closed push button PBC after button PBC is released.

The circuit for holding coil O includes contacts LS4 of mechanically actuated limit switch assembly 21 contained in a shunt circuit around normally closed torque limit switch TO, connected in series with contacts LS3 of mechanically actuated limit switch assembly 21, normally open valve opening push button PBO and its normally open shunt holding switch circuit contacts O4 closing of which is controlled by energization of holding coil O, normally closed overload switch OL1 and normally closed manual cut out switch 210. Holding coil O upon energization additionally closes its holding contacts O1, O2, O3 and O4 to establish a closed circuit through these contacts, through normally closed overload switches OL2 and OL3 to motor 101 from lines L1, L2 and L3 to cause energization of the motor in the valve opening direction, and to maintain contact across push button PBO after button is PBO is released.

In parallel with the circuits for holding coils C and O and connected respectively between lines L1 and L2 through resistances R2 and R5 are normally closed contacts LS2 and LS5 of mechanically actuated limit switch assembly 21 which control valve position indicating lights K2 and K5 respectively.

Motor terminals T1, T2 and T3 and current leads L1, L2 and L3 are connected between valve actuator drive motor 101 and terminal posts on the terminal board 125; position limit switches LS1 to LS5 are connected between limit switch actuator assembly 21 and terminal posts on terminal board 125; and torque close and open limit switches are connected between torque limit switch actuator assembly 95 and terminal posts on terminal board 125 substantially as shown in FIGURE 2 in a manner well-known in the art.

Operation

Assuming the valve is in its fully open position, the "open" limit switch actuator arm 94 (FIGURE 2) will be in a position effecting a closing of contacts LS1 (closed contacts LS1 permit closing of the valve even if the valve is stuck in the back seat firmly enough to require an initial closing torque sufficient to effect opening of the protective torque switch TC) and an opening of contacts LS2 and LS3 and light K2 will be off. The "close" limit switch actuator arm 94 will be in a position such that contacts LS5 are normally closed, light K5 will be on, indicating the valve is fully open and contacts LS4 are open. To then close the valve, push button PBC is operated establishing a current path from line L1 through limit switches TC and LS1 through the contact of push button PBC, through holding coil C to line L2. Immediately upon energization of holding coil C holding contacts C4 close to bypass push button PBC so that push button PBC may be immediately released without disrupting the closing circuit and holding contacts C1, C2 and C3 are closed to start the motor running which causes the valve stem drive train to move in the valve closing direction.

As the valve starts to close, "open" limit switch quickly changes contacts to open contacts LS1 and close contacts LS2 and LS3. The closing of contacts LS2 causes light K2 to come on (both lights K2 and K5 now being on, the valve is indicated as being in an intermediate position) and contacts LS1 having opened leave the closing operation under the sole control of torque switch TC and contacts LS3 having closed prepare a valve circuit through torque switch TO.

Just before the valve seats, the "close" limit switch changes contacts to open contacts LS5 (causing light K5 to go off) and to close contacts LS4 to shunt torque switch TO.

Upon closing of the valve and its seating under a seating force sufficient to actuate plunger 131, torque limit switch TC is opened by the torque limit switch actuator mechanism disrupting the circuit to the motor, as LS1 has previously opened.

To then open the valve, push button PBO is depressed and the high torque starting circuit provided from line L1 through previously closed limit switches LS3 and LS4 (torque switch TO being opened due to unseating torque), through holding coil O, its holding circuit contacts O4 and its motor contacts O1, O2 and O3 is established to energize the motor in the valve opening direction. This circuit assures full motor power to break the valve away from its seat since neither switch LS3 or LS4 can open until contactor arm 94 moves away from these contacts, a condition impossible of attainment until worm gear 141, shaft 131 and valve stem 57 are freed to rotate with respect to the valve seat.

As the valve begins to open, the torque switch TO closes due to removal of unseating torque. Then the "close" limit switch opens limit switch contacts LS4 and closes contacts LS5 lighting lamp K5 and disrupting the high torque starting circuit leaving further opening movement of the valve to the joint control of torque switch TO and limit switch LS3. Upon reaching full open valve position, the "open" limit switch will close limit switch contacts LS1, LS2 to prepare a valve closing circuit and contacts LS3 will open to disrupt the valve opening circuit to motor 101.

If an over torque condition occurs while closing the valve, the valve being in an intermediate position, torque limit switch contact TC will open and break the circuit to the motor. To then back off the valve so that it can be freed of the obstruction and again moved toward its fully closed position, push button PBO can be operated to establish a valve opening circuit through limit switch contacts LS3 and torque switch TO, as contact LS4 is open at this time. Conversely if an over torque condition is confronted upon opening, the valve being in an intermediate position, switch TO will open breaking the circuit to the motor. To then back off the valve so that it can be moved to its fully open position, push button PBC must be operated to establish a circuit through its contact and switch TC, as contact LS1 is open.

It will be apparent to one skilled in the art that the above described electrical control system provides the valve operator of the instant invention with over torque protection in all positions of the valve, that all positions of the valve are indicated by the on off lights, that when the valve reaches its open position the valve operator drive motor is normally turned off by a limit switch and that as the torque limit switch TC must be actuated upon closing of the valve before the motor will be turned off the valve will always tightly seat.

In event motor operation is disrupted because of a current failure, manual operation of the valve can be effected through operation of hand wheel 211. To assure that hand and motor operation cannot take place simultaneously, the present invention provides the handwheel stub shaft 212 journalled at its outer end in bearing sleeve 214 in cover 32 (FIGURE 4) and at its inner end in bearing sleeve 216 in cylindrical wall 47. Stub shaft 212 carries freely, rotatably and axially slidably manually operated driving gear 218 having teeth 220 which cooperate with the teeth 222 carried by input pinion gear 88 mounted on the end 87 of worm gear valve operating drive shaft 64 only after the power circuits to drive motor 101 have been disrupted by operation of manual electrical cut off switch 210. To this end manual drive gear 218 is normally biased out of engagement with pinion gear 88 by a spring 221 which extends between gear 218 and a snap washer 223 mounted in a groove on the inner end of stub shaft 212.

To axially shift gear 218 into engagement with gear 88 against the bias of spring 221 the following mechanism is provided. Driving gear 218 is provided with two diametrically opposite substantially V-shaped end recesses 224 and stub shaft 212 is provided with a diametrically extending cam pin 226 held in place by set screw 228. Pin 226 extends outwardly from stub shaft 212 and cammingly cooperates with end recesses 224. Also provided is a lockout lever 230 non-rotatably carried by one end of a shaft 232 rotatably mounted in a bore 234 in cover 32. A V-shaped interlock member 236 is fixed to the other end of shaft 232 by securing end 238 of one leg to shaft 232. Its other leg end 239 lies adjacent the teeth 220 of gear 218. Cooperating with V-shaped member 236 and disposed between its two legs is a projection 240 formed on the long leg 241 of a bell crank shaped interlock lever 242 which intermediate its ends is rotatably mounted by pin 243 on U-shaped bracket 244 on panel board 125. Long leg 241 extends immediately across the end face of drive gear 218 to prevent gear 218 from being advanced toward and prematurely engaging gear 88 while the motor power circuit is closed. The short leg 246 of bell crank lever 242 is horseshoe shaped and extends outwardly through panel board 125 and carries a movable contact element 248 forming the movable contact of manual cut out switch 210. Actuation of handwheel 211 is normally ineffective to engage the manual drive to worm shaft 64 since handwheel 211, shaft 232 and gear 218 merely rotate as a unit in the position shown in FIGURE 4 until lockout lever 230 is moved to actuate interlock member 236.

To manually operate the valve, lever 230 must be lifted from its seated position against stop 250 causing shaft 232 to rotate and carry the leg end 239 of V-shaped member 236 into interfering engagement with teeth 220 of drive gear 218. Concommitantly the leg fixed to shaft 232 picks up projection 240 on the leg 241 of bell crank 242 rotating the bell crank around pin 243 out of the path of drive gear 218 and shifting short end 246 to move contact element 248 to open electrical cut out switch 210 and break the power circuits to motor 101.

Driving gear 218 may now be moved against the bias of spring 221 into cooperation with gear 222 merely be rotating handwheel 211 in either direction. Such movement rotates stub shaft 212 causing pin 226 to cam gear 218 axially along shaft 212 by its interaction with V- shaped slot 224 in gear 218 as the gear 218 is held against rotation by the interaction of the end 239 of member 236 and the teeth 220 of drive gear 218. Slot 224 is so shaped that upon gear 218 being cammed the proper amount gear 218 will be drivingly engaged with gear 88 and end 239 of member 236 will slide endwise out of engagement with teeth 220 and ride on the plain hub periphery of gear 218 behind teeth 220 so long as rotation of handwheel 211 is continued. Continued rotation of handwheel 211 and drive gear 218, rotates pinion gear 88 in one or the other of its driving directions resulting in the entire valve operator drive train being manually powered to actuate the valve, the frictional resistance of the valve permitting cam 224 to oppose bias spring 221.

From the foregoing description, it will be apparent to one skilled in the art that the manual operating mechanism provided by this invention provides a positive manual drive which cannot be operated unless the motor circuit is broken.

A modification of the connection between power take off shaft 137 and valve stem 57 is shown in FIGURE 8. This modification, dispensing with the planetary gear system, is intended to employ an alternate shaft 137 having a plain lower end fixedly connected by pin 253 to a coupling sleeve 55 having internal splines 255. Splines 255 axially slidably directly engage the splines of a worm shaft 255 normally provided in reciprocating gate valves. In this modification, no gear reduction is provided other than that of the main worm gear connection.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. A valve operator comprising a main housing adapted to be mounted on the body of a valve having a protruding valve stem end, said housing having a chamber surrounding said protruding valve stem end; valve actuating mechanism including a reversible motor, worm pinion shaft means driven by said motor, a worm gear journaled in said housing and meshingly engaged with and driven by said worm pinion shaft means, a driven shaft drivingly coupled to said worm gear through intermeshing axially directed helical splines whereby relative axial movement between said worm gear and driven shaft is permitted in either direction in response to torque thrust forces developed when said worm gear drives said driven shaft in a selected direction, means yieldingly supporting one end of said driven shaft for opposite axial and rotational movement with respect to said main housing to establish a predetermined resistance to said relative axial movement between said worm gear and driven shaft and means slidably and non-rotatably coupling the other end of said driven shaft to the protruding valve stem end; and motor control means comprising cut out switches operatively connected to said driven shaft for disrupting motor operation in response to axial movement of said driven shaft in either direction relative to said worm gear when said predetermined resistance is exceeded, position limit switches operatively connected to said worm pinion shaft for actuation thereby to establish respective opposite directional motor drive circuits when said valve operator reaches its opposite limit positions, and manual switch means selectively operable to energize said respective opposite directional motor drive circuits established by said position limit switches.

2. The combination defined in claim 1 wherein said means yieldingly supporting one end of said driven shaft comprises a plunger element one end of which is formed to provide a bearing seat recess and the other end of which is formed to clampingly receive a torque switch actuator arm; a journal bearing having its inner race fixed to said one end of said drive shaft and its outer race fixed in said bearing seat recess against relative axial movement with respect to said plunger element preloaded coil; spring means fixed to said plunger between its ends; and plunger housing means fixed to said main housing and abuttingly engaging the opposite ends of said preloaded coil spring means and slidingly supporting the other end of said plunger means.

3. The combination defined in claim 1 wherein said means slidably and non-rotatably coupling the other end of said driven shaft to said protruding valve stem end comprises splines formed on said other shaft end; a planetary gear assembly comprising a stationary casing fixedly mounted in said main housing; an internal ring gear fixed to said casing; a planet gear carrier journalled in said casing and having a plurality of pinions journalled thereon in annularly spaced relation with their gear teeth in meshing engagement with the splines formed on said other shaft end and said internal ring gear; and spline means coupling said planet gear carrier to said protruding valve stem end.

4. The combination defined in claim 1 wherein said means slidably and non-rotatably coupling said other end of said driven shaft to said protruding valve stem end comprises a sleeve fixed to said other shaft end and having internal splines; and external splines on said valve stem end directly connecting said coupling sleeve to said protruding valve stem end.

5. A valve operator for moving a valve having a protruding splined stem between its opposing open and closed positions comprising a housing having an open end adapted to receive the protruding valve stem and to fixedly mount said housing on the valve body, said housing defining a worm gear and pinion chamber; a main worm and pinion drive assembly mounted in said worm gear and pinion chamber for relative rotational driving engagement and including a driven worm gear having a through shaft bore containing axially directed helical splines; a driven shaft having a shaft portion between its ends formed with axially directed helical splines matingly engaged with the helical splines of said worm gear bore and having one end disposed in the open end of said housing and provided with axial spline means for axially slidably and non-rotatably coupling said driven shaft to said protruding splined valve stem; spring mounted plunger means rotatably coupled to the other end of said driven shaft and yieldably supported by said housing to establish a predetermined yieldable axial relationship between said worm gear and said shaft to yieldably resist axial movement of said driven shaft in either direction under influence of thrust forces applied through said helical splines; electrical motor means mounted on said housing and drivingly coupled to the pinion of said worm and pinion drive assembly; opposing torque limit switch means controlling said electric motor means mounted on said housing in juxtaposition to said plunger means including a coupling connection to said plunger means for actuating a predetermined torque limit switch means in accord with the direction of axial movement of said driven shaft and said plunger means with respect to the worm gear of said worm and pinion drive assembly; opposing limit switch means controlling said electric motor means mounted on said housing and drive coupled to the pinion of said worm and pinion drive assembly including a limit switch shunt connected around one torque switch and adapted to form a closed circuit connection only when said limit switch means is in its first limit position, a second limit switch series connected to an opposing torque switch and adapted to disrupt the operation of said electrical motor means upon said limit switch means arriving at said first limit position and a third limit switch shunt connected around said opposing torque switch and adapted to form a closed circuit connection only when said limit switch means is in a second limit position; and manual switch means for selectively initiating operation of said electrical motor means from one of its limit positions to the other of its limit positions under control of said respective torque switches.

6. A valve operator comprising a main housing having openings in a pair of faces for respectively mounting said main housing on a valve to be operated in surrounding juxtaposition to the valve stem and for mounting a torque limit switch assembly thereon, and a third open face for mounting an electrical drive motor; worm gear means journalled in said housing in axial parallelism to said valve stem and having a shaft bore provided with axially directed helical splines; worm shaft means journalled in said housing and meshingly engaged with said worm gear, said worm shaft means being adapted for driving connection with an electric motor mounted on said third face; driven shaft means having axially directed helical splines matingly cooperating with the splines of said worm gear means; plunger means journalled on and extending from one end of said driven shaft means through the main housing face opposite said first mentioned pair of housing faces, said plunger means including a preloaded coil spring means and a cooperating housing therefore fixed to said main housing and adapted to yieldingly maintain said plunger means and said driven shaft means in longitudinal centered relation with respect to the shaft bore of said worm gear means; means slidingly drivingly connecting the other end of said driven shaft means to said valve stem; a torque limit switch assembly mounted on the other of said pair of housing faces; linkage means connected to said plunger means and said torque limit switch assembly and adapted to undergo predetermined directional movement in response to axial movement of said driven shaft means and said plunger means under influence of torque force moments applied through said helical splines and exceeding the resistance offered by said preloaded coil spring means to actuate a respective torque limit switch; and motor means drivingly connected to said worm shaft means and adapted upon actuation of said respective torque limit switches to disrupt the motor drive so long as the instantaneous torque force moments exceed the resistance of said preloaded spring means.

7. The combination of claim 6 wherein said preloaded spring means exerts a resistance force sufficient to overcome normal force moments required to open and close the valve whereby said driven shaft means is maintained in its normal centered relation to said worm gear means so long as the applied torque force moments do not exceed the preloaded spring resistance.

8. The combination of claim 6 wherein said worm shaft means is provided with an additional normally inoperative manual drive gear means; said housing supports an electrical terminal board through which the motor and torque limit switches are connected; and a manually operable circuit cut out switch is provided on said electrical terminal board to effectively cut out the motor power circuits when operation of said manual drive means is desired.

9. The combination of claim 8 wherein the manual drive gear means comprises an input power shaft having axially shiftable gear means thereon, hand wheel means operable to rotate said input power shaft to advance said shiftable gear menas axially along said shaft, driven gear means on said worm shaft means engageable by said shiftable gear means upon continued rotation of said input power shaft and operable to impart valve operating movement to said worm shaft means; an interlock lever means normally disposed in a first position to prevent engaging movement of said shiftable gear means and to maintain the circuit cut out switch closed; and interlock lever actuating means comprising a manually actuatable shaft having a combined interlock lever lift arm and shiftable gear means anti-rotation arm secured thereto, said interlock lever lift arm being effective upon operation to engage the teeth of the shiftable gear means to prevent rotation of said shiftable gear means during initial operation of said input power shaft and to move said interlock lever means to a second position to open said circuit cut out switch and disrupt the electrical power circuit to said motor means and permit advancing movement of said shiftable gear means to establish a driving connection with said worm shaft means.

10. A torque switch actuating assembly for use with a motor driven valve operator having a main worm pinion input drive shaft journalled in an operator housing comprising a worm gear having a helically splined shaft bore the opposite ends of which are formed by hub extensions providing respective external journal bearing seats for journalled support of said worm gear in said operator housing; an output shaft having a body portion formed with external helical splines matingly engaged with the splines of said worm gear shaft bore and opposite projecting end portions one of which provides a bearing journal portion and a threaded tip and the other of which is adapted for splined output drive connection; a journal bearing and clamp nut assembly fixedly connecting said inner race of said journal bearing to said one shaft end portion; an axially directed switch actuating plunger having an end portion providing an end opening bearing seat recess fixedly receiving said journal bearing outer race, a reduced diameter body portion forming with said end portion a first abutment shoulder, a reduced diameter threaded portion forming with said body portion a second abutment shoulder and a reduced diameter end portion terminating in an annularly shouldered support and threaded tip portion; a spring assembly for resisting axial movement of said output shaft and plunger in both directions comprising a first enlarged diameter abutment washer abuttingly related to said first abutment shoulder, a coil compression spring surrounding said plunger body portion with one end abutting said abutment washer, a second enlarged diameter abutment washer disposed in abutting engagement with the other spring end and a compression washer and nut assembly abuttingly contacting said second enlarged abutment washer and threaded on said reduced diameter threaded portion into abutting contact with said second abutment shoulder to precompress said coil spring; and a housing assembly enclosing said spring assembly and having oppositely facing, axially spaced, abutment surfaces abuttingly engaging the faces of said first and second enlarged diameter abutment washers opposite the spring abutted washer faces, an end journal bearing supportingly engaging said reduced diameter end portion inwardly from the shoulder formed by said support and threaded tip portion and flange means for fixing said housing assembly to said operator housing to support said plunger and output shaft with said helical shaft splines in axial centered position in said worm gear bore.

11. The assembly of claim 10 together with a switch actuator arm having one end encircling the support portion of said shouldered support and threaded tip of said switch actuating plunger, its other end adapted for pivotal connection to a switch actuating link and a guide slot intermediate its ends; a clamp nut threaded on the threaded portion of said shouldered support and threaded tip of said switch actuating plunger; and a post fixed at one end to said operator housing and extending into and through the guide slot of said switch actuator arm to retain said switch actuating plunger against rotational movement and confine said switch actuator arm to reciprocating movement along a predetermined path.

12. The assembly of claim 10 wherein said worm gear and said output shaft are respectively composed of bronze and steel thereby assuring a substantially friction free torque responsive connection.

13. The assembly of claim 10 wherein low helix angle helical splines are employed in the torque responsive in the worm and output shaft connection thereby assuring a high lead angle, a correspondingly small thrust reaction and a relatively high output torque value for seating a valve.

14. The assembly of claim 10 wherein said worm gear and said worm pinion input drive shaft constitute a low gear ratio high speed input gear set directly connectible to the drive motor and the other end of said output shaft is provided with axially directed spline teeth to form it into a planetary gear assembly sun gear for effecting a final output speed gear reduction thereby providing the desired overall geared down drive in a compact attachment unit.

15. A motor driven valve operator comprising a main housing having a chamber defining, lower side wall structure adapted for mounting said housing on a valve to be operated, an upper generally planar top wall having a pair of spaced mounting pad defined shaft openings and oppositely directed side walls respectively formed with a mounting pad defined motor shaft inlet opening and a mounting pad defined manual input power shaft inlet opening; input worm shaft means extending between said oppositely directed side walls and including a first input pinion gear at one end for driving connection to a motor shaft, a second input pinion gear at the other end for driving connection, a manual input power shaft, a main worm drive pinion and a limit switch worm drive pinion located at spaced intervals along said input worm shaft means to dispose said respective worm drive pinions in subjacent juxtaposition to the top wall shaft openings; respective worm gears meshingly engaging said worm drive pinions; output shaft means drivingly coupled to one of said worm gears and extending through one of said top wall shaft openings; a position limit switch assembly mounted on said top wall in position to drivingly receive said output shaft means; a torque responsive reciprocating shaft means drivingly coupled to the other of said worm gears and having one end extending through the other of said top wall shaft openings and its other end extending into the chamber defined by the housing side wall structure; a torque switch assembly mounted on said top wall and operatively connected to said torque responsive reciprocating shaft means; a cover member secured to said top wall in enclosing relation to said switch assemblies and providing ready access thereto for maintenance and repair; motor means mounted on the mounting pad defining the motor shaft inlet opening and drivingly coupled to said first input pinion; manual input power means mounted on the mounting pad defining the manual input power shaft inlet opening and including means for selectively coupling it to said second input pinion; and means drivingly connecting the other end of said torque responsive shaft means to the valve actuating element.

16. The valve operator of claim 15 wherein said motor means includes an adapter plate comprising an end wall providing an annular mounting pad on one face having annularly spaced through bolt openings therein adapting said plate for mating cooperation with a standard motor housing and also having a through shaft opening concentric with said mounting pad to freely pass the motor shaft; and side and partition walls extending from the face of said end wall opposite that containing the annular mounting pad and defining along two adjacent sides a generally L-shaped chamber in partial surrounding relation to a motor shaft chamber matingly shaped to cooperate with the mounting pad defined motor shaft inlet opening of said main housing, said side and partition walls having end faces for sealingly cooperating with the mounting pad defining the motor shaft inlet opening of said main housing.

17. A valve operator for moving a valve between its opposed open and closed positions comprising a housing having a pair of faces for respectively mounting said housing on a valve to be operated in juxtaposition to the valve stem and for mounting a limit switch actuating means; worm gear means journalled in said housing and having a shaft bore provided with axially directed helical splines; worm shaft means journalled in said housing and drivingly meshingly engaged with said worm gear, said worm shaft means being adapted for driving connection with an electric drive motor mounted by said housing; actuator shaft means having axially directed helical splines between its ends adapted for mating cooperation with the splines of said worm gear means and plunger means extending from one end through the one housing face upon which said switch actuating means is mounted, said plunger means including a double acting spring means for yieldingly maintaining said actuator shaft means in axially centered relation with respect to the shaft bore of said worm gear means, means slidingly drivingly connecting the other end of said actuator shaft means to the valve stem; torque limit switch actuating means mounted on said one open face and including a pair of switches and bell crank linkage means connected to said plunger means and adapted to selectively actuate a respective switch upon predetermined directional longitudinal movement of said actuator shaft means with respect to said worm gear means under influence of torque force moments applied through said helical splines to shift said shaft means against the resistance offered by said double acting spring; and motor means connected to said worm shaft means and adapted upon actuation of one of said torque limit switches to disrupt the drive to said worm shaft means and said worm gear means.

18. The combination of claim 17 wherein said worm shaft means is provided with an additional normally inoperative drive gear means, said housing supports an electrical terminal board through which the motor is connected and a circuit cut out switch and manual power means is provided comprising a manual power shaft having a shiftable gear means journalled thereon and hand drive wheel means secured thereto and operable under predetermined conditions to advance said shiftable gear means into engagement with said additional normally inoperative gear means upon rotation of said manual power shaft to impart valve operating movement to said worm shaft means; an interlock lever normally disposed in an operative position to prevent engaging movement of said shiftable gear means and maintain said cut out switch closed to energize the electrical power circuit to said motor means; and an interlock lever release means comprising a manually actuatable shaft having a combined interlock lever lift arm and shiftable gear means anti-rotation arm secured thereto, said interlock lever release means being effective upon operation to engage the teeth of the shiftable gear means to prevent rotation of said shiftable gear means during initial operation of said manually actuatable shaft and to move said interlock lever to a position to disengage said cut out switch and disrupt the electrical power circuit to said motor means, whereby engaging movement of said shiftable gear means and establishment of a manual driving connection with said worm shaft means is possible only when said motor means is rendered inoperative.

References Cited in the file of this patent
UNITED STATES PATENTS

| | | |
|---|---|---|
| 1,943,854 | Beckwith | Jan. 16, 1934 |
| 2,028,696 | Beckwith | Jan. 21, 1936 |
| 2,203,233 | Panish | June 4, 1940 |
| 2,593,020 | Glover | Apr. 15, 1952 |
| 2,683,848 | Schmitter | July 13, 1954 |
| 2,745,294 | Kron | May 15, 1956 |
| 2,771,786 | Gilbert | Nov. 27, 1956 |
| 2,900,842 | Simpson | Aug. 25, 1959 |
| 3,087,105 | Hoover | Apr. 23, 1963 |